April 21, 1959
W. E. LEWIS ET AL
2,883,507
HEATING UNIT CONTROL SYSTEM
Filed Dec. 20, 1956
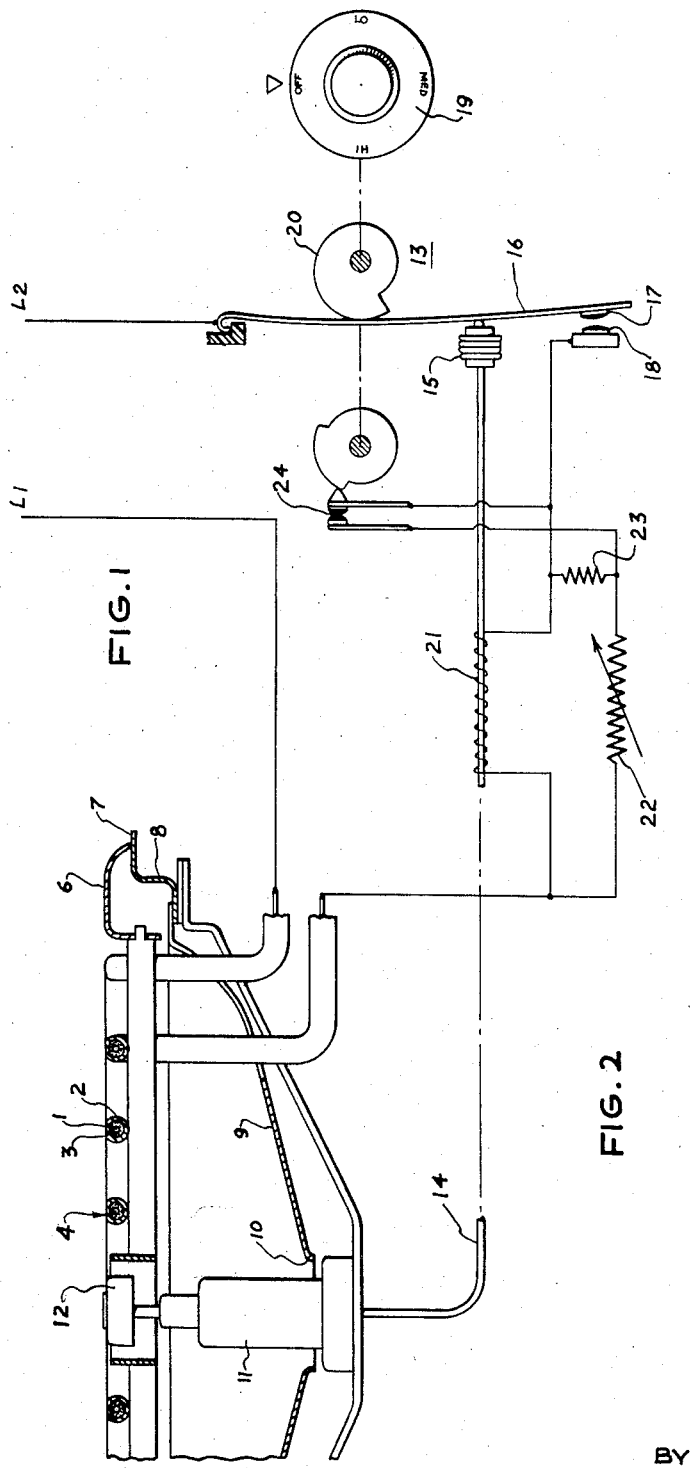
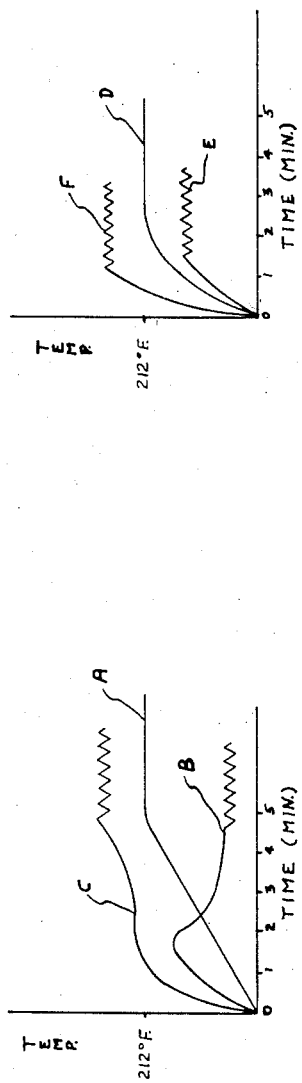
INVENTORS.
WALTER E. LEWIS
& SAMUEL C. JORDAN
BY 
THEIR ATTORNEY

United States Patent Office 2,883,507
Patented Apr. 21, 1959

2,883,507

HEATING UNIT CONTROL SYSTEM

Walter E. Lewis, Louisville, and Samuel C. Jordan, Lyndon, Ky., assignors to General Electric Company, a corporation of New York Application December 20, 1956, Serial No. 629,499

5 Claims. (Cl. 219—20)

This invention relates to automatically controlled heating devices, and more particularly to an automatic temperature control system for surface heating units of the type employed in cooking ranges.

A principal object of this invention is to provide an automatic control system for electric heating units in which the heat output of the unit is controlled in accordance with both the temperature and the thermal mass characteristics of the material being heated.

Another object of this invention is to provide an automatically controlled surface heating unit arranged selectively to maintain the various boiling rates utilized in cooking operations.

Further objects and advantages of this invention will become apparent as the following description proceeds, and the features of novelty which characterize the invention will be pointed out with particularity in the claims annexed to and froming a part of this specification.

Briefly stated, in accordance with one aspect of the invention there is provided a heating system including a surface heating unit, a thermostatic bulb arranged to rest in heat transfer relation with a utensil supported on the heating unit, a manually adjustable thermostat operatively associated with the thermostatic bulb, an auxiliary heating element in heat transfer relation with the pressure actuated means of the thermostat, and means for energizing the heating element so that its heat output progressively decreases during each energization cycle of the system, whereby the thermostat is actuated in accordance with the temperature signal supplied by the thermostatic bulb and a variable auxiliary signal supplied by the heating element.

For a better understanding of this invention, references may be made to the following description and the accompanying drawing in which:

Fig. 1 is a diagrammatic view of a surface heating unit system arranged in accordance with the present invention.

Fig. 2 is a graphical representation of the performance characteristics of the system shown in Fig. 1 when a relatively large quantity of water is heated.

Fig. 3 is similar to Fig. 2 but shows the operating characteristics when a relatively small quantity of water is heated.

While the present invention is particularly adapted for use in conjunction with the surface heating unit of an electric range, the invention is not limited solely to this application inasmuch as the control arrangement disclosed and claimed herein may find other applications in various types of heating devices. Referring to Fig. 1 of the drawing, there is shown an embodiment of the invention arranged to control an electric heating unit of the type commonly employed for the surface heaters of an electric range. Although the particular form of the heating unit employed forms no part of the present invention, it is illustrated as comprising a helical resistance conductor 1 mounted within an outer metallic sheath 2 and supported in spaced relation with reference to the outer sheath by an electrical insulating heat conducting mass 3 such as highly compressed magnesium oxide. A complete heating element 4 is arranged in a spiral coil with the turns supported in spaced relation on a plurality of supporting arms 5. Arms 5 are mounted on a ring member 6 which is adapted to rest on the cooking top 7 of an electric range. Heating unit 4 rests over a circular opening in cooktop 7 defined by flange 8, the flange being arranged to support a generally conical reflector pan 9 having a central opening 10 therein.

In order to control the heat output of heating unit 4 in accordance with the temperature of the cooking load, it is, of course, necessary to provide some means for sensing that temperature, and, therefore, there is provided a temperature detector assembly 11 mounted centrally below the heating unit and arranged to support a thermostatic bulb 12 in heat transfer relation with the bottom of a cooking utensil placed on the unit.

Thermostatic bulb 12 is hydraulically connected to a thermostat generally designated by the numeral 13 by means of a fluid filled tube 14 communicating with a pressure actuated bellows 15. As is well known in the art, bellows 15 expands and contracts in accordance with variations in the temperature of bulb 12, and is arranged to actuate a thermostatic arm 16 which carries a movable thermostatic switch contact 17 associated with fixed contact 18. Thermostat 13 includes manually adjustable temperature setting means comprising a control knob 19 arranged to rotate a temperature setting cam 20 which cooperates with thermostatic arm 16. Switch contacts 17 and 18 are adapted to connect heating unit 4 to an electric power source L1, L2, and thus the heat output of surface unit 4 is controlled in accordance with the periodic actuation of contacts 17 and 18 in response to variations in the temperature of thermostatic bulb 12.

Because the temperature of thermostatic bulb 12 tends to lag behind the temperature of the utensil being heated, particularly in the case of cooking loads of low thermal mass such as a small frying pan containing a few strips of bacon, for example, it is necessary that the heating unit be de-energized somewhat before the temperature sensing bulb signals that the heating current should be de-energized. This function may be achieved by means of an auxiliary heating element 21 in heat transfer relation with bellows 15 and connected in circuit with heating unit 4 so as to be energized simultaneously therewith. As shown in Fig. 1, heating element 21 is connected in series with heating unit 4, and supplies an "anticipation" signal to the hydraulic thermostatic system each time heating unit 4 is energized. Thus when a light cooking load is being heated, the additional pressure resulting from the heat supplied by heating element 21 causes thermostatic contacts 17 and 18 to open before thermostatic bulb 12 reaches the desired temperature, and the cooking utensil is brought up to the desired temperature by the stored heat in the heating unit, rather than being overheated by this stored heat.

Heating element 21 also performs an important function during boiling operations, during which the temperature of bulb 12 remains substantially constant as soon as the boiling point is reached. During such heating operations heating element 21 supplies a periodic signal which causes contacts 17 and 18 to cycle between open and closed positions, thus providing means for regulating the heat output of heating unit 4 so that various boil rates, ranging from "simmer" to "rolling boil," may be achieved.

We have found that if heating element 21 has a wattage value sufficiently high to provide satisfactory anticipation (i.e. deenergization of heating unit 4 in advance of a signal from bulb 12 that the desired temperature has been reached) during the cooking of light frying loads, relatively poor performance during the cooking of heavy frying and boiling loads may result. While a strong anticipatory signal is needed to prevent overheating of light cooking loads, such a signal is detrimental to good performance during the cooking of heavy loads, such as an open utensil containing a relatively large quantity of water. Under these conditions, the attainment of the desired cooking temperature is substantially delayed because after de-energization of the heating unit, the stored heat therein is insufficient to bring the large load up to the desired temperature and consequently the desired temperature is not reached on the first heating cycle. In accordance with the present invention, this difficulty has been overcome by the provision of current regulating means associated with heating element 21 for progressively reducing the current passing therethrough during each energization cycle. By this means the anticipation signal is relatively high during the early portion of each cooking operation, and will cooperate with a rapidly rising temperature signal (such as the signal produced when a light cooking load is being heated) to de-energize heating unit 4 in advance of the attainment of the desired temperature. On the other hand, if a heavy cooking load is involved the temperature of thermostatic bulb 12 remains at a relatively low value during the initial portion of the cooking operation and consequently by the time it begins to rise substantially, the anticipation signal has decreased to a point where it has very little effect on the control of the heating unit.

As shown in Fig. 1, we have utilized a thermistor 22 (having a negative temperature coefficient of resistance characteristic) connected in parallel with heating element 21 so as to regulate the current flowing therethrough. At room temperature the resistance of thermistor 22 is many times that of the resistance of heating element 21, and consequently almost all of the current supplied to heating unit 4 passes through heating element 21 causing its temperature to rise rapidly. However, as the temperature of thermistor 22 increases as a result of heat generated internally its resistance drops to a value substantially the same as or somewhat below that of heating element 21 and consequently the current flowing through the latter is reduced by approximately one-half, which, of course, results in a heat output approximately one quarter as large as its initial heat output.

From the description thus far it will be seen that heating element 21 initially supplies a signal to bellows 15 which is large in proportion to the signal received from thermostatic bulb 12, but that this auxiliary signal progressively decreases as the energization of heating unit 4 continues so that if the resistance characteristics of thermistor 22 are such that its resistance becomes negligible at the maximum temperature it achieves as a result of self-heating, the heat output of heating element 21 becomes negligible and consequently may be ineffective in regulating the boiling rate if a heavy boiling load is to be brought to a rolling boil. In such a case the temperature setting of thermostat 13 corresponds to a temperature substantially above the boiling point of water and therefore a substantial signal from heating element 21 is required to cause bellows 15 to expand sufficiently to open contacts 17 and 18. In practice, it has been found that if the resistance of the parallel circuit including thermistor 22 is not limited to a value sufficient to cause heating element 21 to produce an appreciable amount of heat even after the temperature of thermistor 22 is stabilized at an elevated temperature, high boiling rates under the control of contacts 17 and 18 cannot be achieved, and instead heating unit 4 remains continuously energized when control knob 19 is set so as to obtain any boiling rate above a low boiling rate. This difficulty may be overcome by placing a limiting resistor 23 in series with thermistor 22, the resistance of resistor 23 being chosen so as to provide sufficient heat output from heating element 21 to provide a rolling boil for heavy boiling loads while permitting the heat output to decrease sufficiently to provide good control at low boil rates and for light frying loads. Alternatively, a shorting switch 24 may be provided for manually varying the resistance of the thermistor branch circuit. As shown in Fig. 1, shorting switch 24 is closed whenever control knob 19 is in the lower one-third of its heating range, corresponding to warming and simmering operations, and is open so as to place resistor 23 in series with thermistor 22 whenever control knob 19 is turned to positions corresponding to medium and high boiling rates, and temperatures required for frying operations.

For the purpose of describing the operation of this invention the performance characteristics of a system including the following components will be considered. It will be assumed that heating unit 4 has a resistance of approximately 43 ohms (and a wattage rating of 1250 watts at 230 volts), auxiliary heating element 21 has a resistance of approximately 0.9 ohm, thermistor 22 has a resistance ranging from approximately 20 ohms at room temperature to approximately 0.5 ohm at its maximum operating temperature, and resistor 23 has a resistance of 0.5 ohm. Referring to Figs. 2 and 3 which illustrate the performance characteristics of this system, curve A illustrates the temperature rise of thermostatic bulb 12 during heating of a large water load, such as a large open cooking utensil containing 2 quarts of water. Curve B illustrates the "temperature signal" received by bellows 15 as a result of the output of heating element 21. The temperature signals represented by curves A and B are, of course, received by bellows 15 as a composite signal (transmitted as fluid pressure) which may be graphically represented by curve C in Fig. 2. It will be observed that the anticipator signal curve B reaches a peak after approximately two minutes of energization, at which time the temperature of bulb 12 represented by curve A is still relatively low. Thus the combined signal is not great enough to expand bellows 15 sufficiently to open contacts 17 and 18 until the temperature of bulb 12 has actually reached the boiling point of approximately 212° F. Thereafter curve A remains flat, corresponding to that temperature, while the energization and de-energization of heating element 21 causes the composite curve C to rise and fall sufficiently to actuate contacts 17 and 18, thus providing periodic energization of heating unit 4 so as to maintain the desired boiling rate.

In Fig. 3 of the drawing, the performance characteristics of the same system during the heating of a relatively small quantity of water (four ounces, for example) are illustrated. Curve D in Fig. 3 corresponds to curve A in Fig. 2, but it will be noted that it rises much more steeply to the pre-set cooking temperature. Curve E corresponds to curve B in Fig. 2, and curve F corresponds to curve C in Fig. 2. During an operation of this nature, it will be noted that the temperature of bulb 12 represented by curve D rises so rapidly that its signal, when combined with the anticipator signal produced by heating element 21, is sufficient to de-energize the heating system before bulb 12 and the cooking utensil actually reach the boiling temperature. In this example the heating system is de-energized by the opening of contacts 17 and 18 after approximately 2 minutes of energization at which point the actual temperature of the utensil may be approximately 190° F. The stored heat in heating unit 4 then causes the utensil temperature to continue to rise to the boiling point, and thereafter the periodic energization of the heating element 21 produces the auxiliary signal illustrated by curve E and the heating system is alternately energized and de-energized as indicated by composite curve F.

It will, of course, be understood that thermistor 22 must be substantially uninfluenced by heat from other sources, and that it must be so located that it may return to room temperature when it is de-energized. Preferably, thermistor 22 is provided with a metallic heat radiating structure (not shown) providing a heat dissipating rate approximately equal to the rate of heat transfer by radiation between the inner turn of heating unit 4 and temperature sensitive bulb 12. In this way, premature termination of the first energization cycle during each of a series of cooking operations may be avoided inasmuch as the cooling rate of thermistor 22 is substantially proportional to the cooling rate of heating unit 4, and its temperature remains at a sufficiently high value to keep the auxiliary signal produced by heating element 21 at a relatively low level. In other words, if a cooking operation is started when heating unit 4 and protector 12 are at an elevated temperature (and thus are producing a "signal" indicating to bellows 15 that the temperature of the load is higher than it actually is) thermistor 22 will also be at an elevated temperature and will rapidly reduce the auxiliary signal produced by heating element 21 so that the power circuit through contacts 17 and 18 is not prematurely opened. However, it should be noted that during cycling operation of the thermostat contacts (after the desired cooking temperature has been reached) the thermistor 22 cools sufficiently each time the contacts open to cause heater 21 to produce a relatively large signal when the contacts reclose, and thus a desirably rapid cycling rate may be achieved during broiling operations.

While we have shown and described a particular embodiment of our invention, we do not desire the invention to be limited to the particular construction disclosed, and we intend by the appended claims to cover all modifications within the true scope of the invention.

What we claim is:

1. An automatic control system for an electric surface heating unit comprising a thermostatic bulb adapted to rest in heat transfer relation with a utensil heated by said heating unit, a thermostat including manually adjustable temperature setting means, a pair of switch contacts adapted to connect said heating unit to an electric power source, pressure actuated means hydraulically connected to said bulb for periodically actuating said switch contacts in response to changes in the temperature of said utensil, a heating element connected in circuit with said heating unit so as to be energized simultaneously therewith and arranged in heat transfer relation with said pressure actuated means, and a current regulating thermistor connected in parallel with said heating element, said thermistor having a negative temperature coefficient of resistance so that the current passing through said heating element progressively decreases during each energization cycle, whereby said switch contacts are actuated in accordance with a temperature signal supplied by said bulb and a variable auxiliary signal supplied by said heating element.

2. An automatic control system for an electric surface heating unit comprising a thermostatic bulb adapted to rest in heat transfer relation with a utensil heated by said heating unit, a thermostat including manually adjustable temperature setting means, a pair of switch contacts adapted to connect said heating unit to an electric power source, pressure actuated means hydraulically connected to said bulb for periodically actuating said switch contacts in response to changes in the temperature of said utensil, a heating element connected in circuit with said heating unit so as to be energized simultaneously therewith and arranged in heat transfer relation with said pressure actuated means, a current regulating thermistor connected in parallel with said heating element, said thermistor having a negative temperature coefficient of resistance so that the current passing through said heating element progressively decreases during each energization cycle, and manually variable resistance means in series with said thermistor, whereby said switch contacts are actuated in accordance with a temperature signal supplied by said bulb and a variable auxiliary signal supplied by said heating element.

3. An automatic control system for an electric surface heating unit as defined in claim 1 in which the resistance of said thermistor varies from a value many times the resistance of said heating element at room temperature to a value substantially equal to said heating element resistance at its maximum operating temperature.

4. An automatic control system for an electric surface heating unit as defined in claim 2 in which the temperature range of said temperature setting means is substantially 150° F. to 450° F., and said manually variable resistance means includes a resistance element in series with said thermistor, a shorting switch for said resistance element, and means associated with said temperature setting means for closing said shorting switch when the temperature setting is below 220° F. and for opening said shorting switch when the temperature setting is above 220° F.

5. An automatic control system for an electric surface heating unit comprising a thermostatic bulb adapted to rest in heat transfer relation with a utensil heated by said heating unit, a thermostat including manually adjustable temperature setting means, a pair of switch contacts adapted to connect said heating unit to an electric power source, pressure actuated means hydraulically connected to said bulb for periodically actuating said switch contacts in response to changes in the temperature of said utensil, a heating element connected in circuit with said heating unit so as to be energized simultaneously therewith and arranged in heat transfer relation with said pressure actuated means, and current regulating means associated with said heating element for progressively reducing the current passing therethrough during each energization cycle, whereby said switch contacts are actuated in accordance with a temperature signal supplied by said bulb and a variable auxiliary signal supplied by said heating element.

References Cited in the file of this patent

UNITED STATES PATENTS

| | | |
|---|---|---|
| 2,273,734 | Pearce | Feb. 17, 1942 |
| 2,339,635 | Hall | Jan. 18, 1944 |
| 2,611,850 | Walton | Sept. 23, 1952 |
| 2,727,973 | Collins | Dec. 20, 1955 |
| 2,767,293 | Jordan et al. | Oct. 16, 1956 |
| 2,784,289 | Hock | Mar. 5, 1957 |
| 2,790,057 | Schauer | Apr. 23, 1957 |